United States Patent
Thompson

(10) Patent No.: US 6,249,510 B1
(45) Date of Patent: Jun. 19, 2001

(54) SIGNAL PROTECTION SYSTEM FOR BI-DIRECTION RING NETWORK

(75) Inventor: William A. Thompson, Middletown Township, Monmouth County, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/151,195

(22) Filed: Sep. 10, 1998

(51) Int. Cl.$^7$ ........................................................ H04J 3/12

(52) U.S. Cl. ..................... 370/223; 370/222; 370/224; 370/225; 370/226; 370/227; 370/228; 359/114; 359/118; 359/119

(58) Field of Search ..................................... 370/222, 223, 370/224, 225, 226, 227; 359/119, 114, 118

(56) References Cited

U.S. PATENT DOCUMENTS

| | | | |
|---|---|---|---|
| 5,058,105 | * 10/1991 | Mansour et al. | 370/228 |
| 5,146,452 | * 9/1992 | Pekarske | 370/228 |
| 5,159,595 | * 10/1992 | Flanagan et al. | 370/224 |
| 5,818,816 | * 10/1998 | Chikazawa et al. | 370/225 |

* cited by examiner

Primary Examiner—Hassan Kizou
Assistant Examiner—Thien D Tran
(74) Attorney, Agent, or Firm—Steve Mendelsohn

(57) ABSTRACT

The channel protection facility in a two-fiber bi-directional line switched ring network may be significantly enhanced by protecting the service channels in one of the fibers with corresponding protection channels in the other fiber and vice-versa. Thus, if a failure occurs such that the content of the service channels cannot be forwarded to an upstream point, then, without having to perform a wavelength conversion function, the service channels may be substituted for the protection channels in the other fiber and forwarded to the upstream point in the opposite direction via the ring network.

6 Claims, 2 Drawing Sheets

SIGNAL PROTECTION SYSTEM FOR BI-DIRECTION RING NETWORK

FIELD OF THE INVENTION

This invention relates to optical networks and more particularly relates to a signal protection feature for an optical ring network.

BACKGROUND OF THE INVENTION

Optical networks require a reliable transport mechanism to transport information between optical nodes (switches) forming a bi-directional ring network. A reliable transport mechanism typically includes diverse transport paths to deliver information signals from one optical node to another optical node. The optical nodes forming the ring network transmit information over the shortest path to an intended recipient. However, if the transmission path fails, then the node will re-transmit the information over the other diverse path to the intended recipient. In this sense, one path provides protection for the other path when a failure occurs.

SUMMARY OF THE INVENTION

I have recognized that such a protection scheme is very expensive to implement in a so-called two fiber Bi-directional Line Switched Ring (BLSR) network arranged in accordance with the well-known Synchronous Optical NETwork (SONET) standard.

Specifically, for a particular optical transmission capacity, e.g., an OC48 optical system, channels 1 through 24 in each direction of a two fiber BLSR are reserved for service and channels 25 through 48 are reserved for protection. Thus, if the fiber carrying the in-service channels fails in one direction, then the transmitting node has to transfer the information from those service channels to the protection channels carried by the other fiber or path. In an optical transport system channels correspond to respective wavelengths, and the transfer would entail converting the wavelengths of the signals of the corresponding service channels to the wavelengths carried in the protection channels. For example, for a 48 channel system, the wavelengths of the signals being carried in channels 1 through 24 (i.e., $\lambda_1$ through $\lambda_{24}$) would have to be respectively converted to the wavelengths carried in channels 25 through 48 (i.e., $\lambda_{25}$ through $\lambda_{48}$) of the protection path. The equipment needed to perform such converting is indeed expensive, and would have to be provisioned at each node of a two fiber BLSR network.

I have further recognized that the foregoing problem may be dealt with at the optical level in an optical ring network by providing a one-to-one correspondence between the service channels that are transported over one fiber and the protection channels that are carried in the opposite direction over the other fiber of a two fiber BLSR network.

These and other aspects of the instant invention will become more apparent from the following detailed description and accompanying drawings.

DETAILED DESCRIPTION

Figure 1:
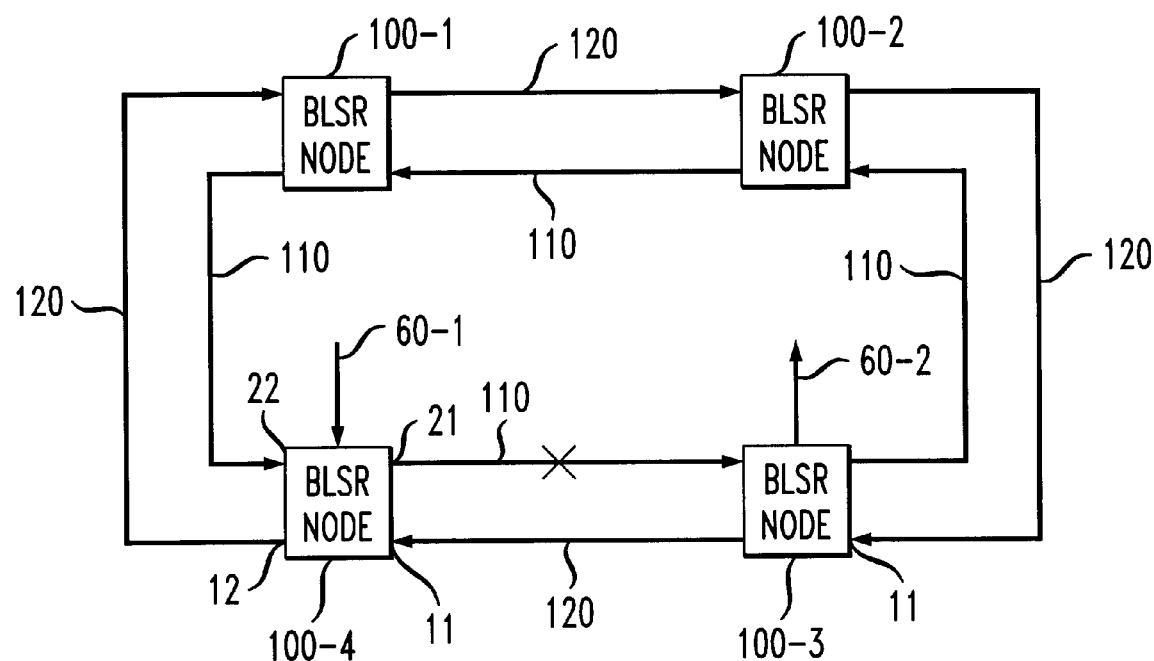
FIG. 1 is a broad block diagram of a two fiber Bi-directional Line Switched Ring (BLSR) network in which the principles of the invention may be practiced.

The illustrative ring network 200 shown in FIG. 1 is formed from a plurality of two-fiber BLSR optical nodes (also referred hereinafter as just nodes) 100-1 through 100-4 that are interconnected by two optical transmission paths 110 and 120. Paths 110 and 120 transport information over the ring network in opposite directions. Assuming that network 200 operates at the 48 wavelength (channel) level, then, priorly, channels 1 though 24 of paths 110 and 120 would have been reserved as service channels and channels 25 through 48 would have been reserved as protection channels. Information is usually transported from one node to another node via the shortest path. For example, assume that node 100-4 receives information destined for node 100-3 via the service channels, e.g., channels $\lambda_1$ through $\lambda_{24}$, over path 110 connected to port 22 of node 100-4. Node 100-4, in turn, forwards the information to node 100-3 via the shortest transmission path, namely, the path 110 connected to port 21 of node 100-4. Node 100-4 similarly forwards information that is destined for node 100-3 and received via another input path, e.g., path 601. (Note that the term "channel" is taken to mean herein an optical signal of a particular wavelength and that a group of channels is taken to mean a group of optical signals of respective wavelengths. In a broader sense, the term "channel" could also be taken to mean "time slot".)

If the path 110 connected to port 21 fails, as represented by the X, then node 100-4, in prior instances, would have to convert the service channels $\lambda_1$ through $\lambda_{24}$ to protection channels $\lambda_{25}$ through $\lambda_{48}$, respectively, so that the information may be forwarded to node 100-3 via the protection channels $\lambda_{25}$ through $\lambda_{48}$ of path 120 connected to port 12 of node 100-4. The information would then be transported via nodes 100-1 and 100-2 and the path 120 segments to port 11 of node 100-3. Node 100-3 would then convert the information signals received via protection channels $\lambda_{25}$ through $\lambda_{48}$ to their expected wavelengths of $\lambda_1$ through $\lambda_{24}$ so that the signals may be forwarded to their ultimate destinations.

As mentioned above, the apparatus needed to convert an optical signal from one wavelength to another wavelength is indeed expensive. Moreover, such apparatus would need to be provisioned at each node in the two-fiber BLSR.

As also mentioned above, such conversion may be eliminated by matching the wavelengths of the protection channels in one transmission path with the wavelengths of the service channels in the other transmission path.

Thus, for example, channels $\lambda_1$ through $\lambda_{24}$ of path 110 and channels $\lambda_1$ through $\lambda_{24}$ of path 120 would respectively serve as service channels and protection channels. In this way, one group of channels in one path would provide protection for corresponding channels in the other path. Similarly, channels $\lambda_{24}$ through $\lambda_{48}$ of path 120 and channels $\lambda_{24}$ through $\lambda_{48}$ of path 110 would respectively serve as service channels and protection channels.

As another example, the odd numbered channels of path 110 ($\lambda_1$, $\lambda_3$, $\lambda_5$, etc.) and the odd numbered channels of path 120 may respectively serve as service channels and protection channels. Similarly, the even numbered channels of those paths may respectively serve as the service and protection channels.

Thus, a two fiber BLSR node arranged in accordance with the principles of the invention would not have to convert the wavelengths of the path 110 service channels to the wavelengths of the path 120 protection channels, or vice-versa, since those channels would respectively correspond to one another.

Figure 2:
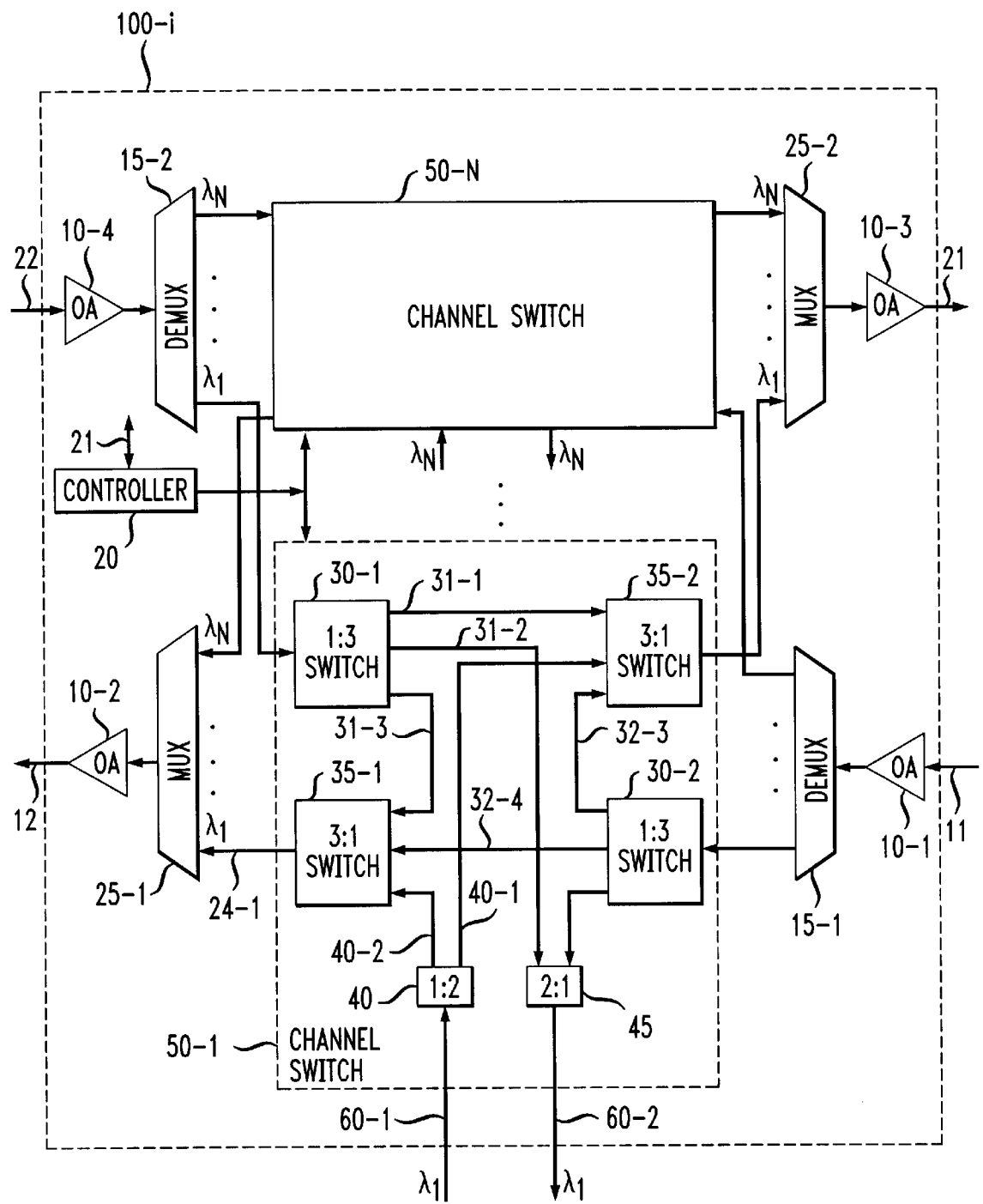
FIG. 2 is a broad block diagram of a node of FIG. 1

A broad block diagram of a node 100-i arranged in accordance with the principle of the invention is illustrated in FIG. 2. Specifically, a node includes, inter alia, a plurality of channel switches 50-1 through 50-N which are assigned to respective channels $\lambda_1$ through $\lambda_N$. A node also includes, for each transmission path; an optional incoming optical amplifier (10-1, 10-4); a wavelength/channel demultiplexer (15-1, 15-2) that demultiplexes an optical signal that it receives from an incoming optical amplifier (or incoming transmission path) into component channels/wavelengths and presents the demultiplexed wavelengths to respective channel switches 50-i; a wavelength/channel multiplexer (25-1, 25-2) that receives the component channels/wavelengths from the channel switches 50-i multiplexes the channels to an output connected to an optional output optical amplifier (10-2, 10-3) for presentation to a respective one of the transmission paths 110, 120. (Note that the need for one or both of the optional optical amplifiers in a path would be determined by the power requirements set for a particular system implementation.)

Each channel switch processes a respective one of the channels, e.g., channel $\lambda_1$, that it receives from paths 110, 120 via a respective DEMUX 15 or that it receives from input 60-1 connected to 1:2 signal splitter 40. (It is noted that since channels switches 50-1 through 50-N have similar structures, a description of one of the channel switches equally pertains to the other channel switches. Thus, the following description is directed to just one of the channel switches 50-i, e.g., channel switch 50-1.) Channel switch 50-1, more particular, includes a pair of 1:3 switches 30-1 and 30-2; a pair of 3:1 switches 35-1 and 35-2; and 2:1 switch 45 as well as signal splitter 40. Channel switch 50-1 responds to instructions issued by a controller 20 which communicates with each of the channel switches 50-i via control bus 21. Such communications includes instructions which control the switching performed by the 1:3 switches, 3:1 switches and 2:1 switch in a channel switch. In particular, 1:3 switch 30-1, responsive to instructions that it receives from controller 20 switches the $\lambda_1$ signal that it receives from path 110 via port 22 and DEMUX 15-2 to one of three output paths, namely output path 31-1 extending to 3:1 switch 35-2, path 31-2 extending to 2:1 switch 45 or path 31-3 extending to 3:1 switch 351. The latter path as well as path 32-3 is a so-called loop-back path and is used for protection purposes and for routine maintenance purposes. The following discusses the protection function only.

Switch 30-2 responds to instructions that it receives from controller 20, and thus performs a similar switching function with respect to the $\lambda_1$ signal that it receives from path 120 via port 11 and DEMUX 15-1. The 3:1 switch 35-1, on the other hand, performs an opposite switching function in that it switches one of its three inputs respectively connecting to loop-back path 31-3, 1:2 splitter 40, path 40-2 and path 32-4 to output path 24-1 connecting to MUX 25-1. MUX 25-1 then multiplexes the signal that it receives from switch 35-1 and other channel switches to OA 10-2 connecting to path 120 at port 12. Switch 35-2 similarly switches, pursuant to controller 20 instructions, one of three inputs to an output connecting to MUX 25-2.

Referring now to FIGS. 1 and 2 and assuming that the path 110 between nodes 100-4 and 100-3 is operable, then an optical signal that node 100-4 receives via port 22 passes through OA 10-4 to DEMUX 15-2. For a 48 wavelength optical system, for example, DEMUX 15-2 demultiplexes the received optical signal into the various component signals having wavelengths of $\lambda_1$ through $\lambda_{48}$, respectively. The demultiplexed $\lambda_1$ signal/channel is supplied to the input of switch 30-1 of channel switch 50-1. Similarly, the $\lambda_2$ through $\lambda_{48}$ signals are respectively supplied to channel switches 2 through N, where N equals 48 in the instant illustrative example. If protection switching has not been invoked, and the $\lambda_1$ signal is not being outputted to 2:1 switch 40, then switch 30-1 outputs the $\lambda_1$ signal to path 31-1 connecting to 3:1 switch 35-2. Switch 35-2 then outputs the signal that it receives via path 31-1 to MUX 25-2 which then multiplexes the $\lambda_1$ signal and the $\lambda_2$ through $\lambda_{48}$ signals received from channel switches 50-2 through 50-48, respectively, to port 21 via OA 10-3.

The optical signal that is received at port 11 via path 120 is similarly handled and the resulting optical signal is multiplexed onto path segment 120 extending to node 100-1 via port 12.

Assume at this point that the path 110 segment between nodes 100-4 and 100-3 fails as represented by the large X on path 110 between nodes 100-4 and 100-3, as shown in FIG. 1. In that event, then, an external mechanism, e.g., a craftsperson or an automated mechanism, would so notify each controller 20 in nodes 100-4 and 100-3 via communication path 21. Each such controller 20 would then invoke protection switching by so instructing the appropriate ones of the switches 30-1 in nodes 100-4 and 100-3. Assuming that the path 110 service channels are $\lambda_1$ through $\lambda_{24}$, then controller 20 in node 100-4 would instruct switch 30-1 in each of the channels switches 50-1 through 50-24 to switch an incoming signal to the loop-back path 31-3 to switch 35-1. Controller 20 would also instruct switch 35-1 in each of the channel switches 50-1 through 50-24 to switch the signal on the respective loop-back path 31-3 to multiplexer 25-1. Switch 35-1 in each of the channel switches 50-25 through 50-48 would continue to switch the path 120 service channels $\lambda_{25}$ through $\lambda_{48}$ received via port 11, OA 10-1, DEMUX 15-1 and the respective switch 30-2 to multiplexer 25-1. Thus, multiplexer 25-1 receives the sequence of the path 110 service channels along with the sequence of path 120 service and multiplexes each such channel in proper order onto outgoing path 120 via OA is 10-2 and port 12 for delivery to node 100-3 via path 120 and node 100-1 and 100-2.

Similarly, controller 20 in node 100-3 would instruct, for example, each of the channel switches 50-1 through 50-48 to switch the respective channel that it receives from DEMUX 15-1 via path 120 and OA 10-1 to an appropriate output, e.g., the associated path 60-2, so that the channel may be forwarded to its intended destination.

As another illustrative example, assume that controller 20 of node 100-3 has instructed a particular channel switch, e.g., channel switch 50-1 of node 100-3, to switch ("drop") channel $\lambda_1$ received via path 110 to output path 60-2. Also assume that controller 20 of node 110-4 has instructed channel switch, e.g., channel switch 50-1 of node 100-4, to add the channel $\lambda_1$ signal that is received via path 60-1 to the signal that is to be outputted to path 110 via MUX 25-1, OA 10-3 and port 21. In response to such instructions at node 100-3, 1:3 switch 301 switches the $\lambda_1$ signal that it receives from DEMUX 15-2 to path 31-2 connected to one input of 2:1 output switch 45, which then outputs the signal to path 60-2 in accordance with the controller 20 instructions. At node 100-4, 1:2 splitter 40, on the other hand, outputs equal portions of the $\lambda_1$ signal that it receives from input path 60-1 to paths 40-1 and path 40-2. In a non-failure state, only switch 35-2 would output that signal pursuant to the node 100-4 controller 20 instructions. That output signal is presented to MUX 25-2, which then "adds" that signal to the signal that will be outputted to path 110 via OA 10-3 and port 21. However, if the path 110 segment between nodes 100-4 and 100-3 has failed, as assumed above, then the node 100-4 controller 20 would instruct 3:1 switch 35-1 to switch the signal that it receives from splitter 40 to its output connected to MUX 25-1. MUX 25-1 would then output the signal via OA 10-2 and port 10-2 in the $\lambda_1$ channel reserved for protecting that signal on path 120, all in accordance with the principles of the invention.

It will thus be appreciated that, although the invention illustrated herein is described in the context of a specific illustrative embodiment, those skilled in the art will be able to devise numerous alternative arrangements which, although not explicitly shown or described herein, nevertheless, embody the principles of the invention and are within its spirit and scope.

I claim:

1. A two-fiber bi-directional ring network comprising a plurality of optical nodes interconnected to form a ring network by first and second optical transmission fibers such that information is transported over the first and second fibers in opposite directions, in which first and second groups of transmission channels in said first fiber are respectively designated service and protection channels and in which corresponding first and second groups of transmission channels in said second fiber are respectively designated protection and service channels, and wherein each of said nodes includes apparatus that, responsive to a notification that one of said first and second fibers connected to an output port of the respective one of said nodes has failed, switches the service group of channels of the failed fiber to the other one of said first and second fibers as the protection channels for the latter fiber without having to convert those service channels to said protection channels as a result of said correspondence.

2. A bi-directional line switched ring network formed from a plurality of optical nodes interconnected via first and second optical transmission paths that transport information in opposite directions, each of said optical nodes comprising first and second ports connecting to a preceding optical node via said first and second optical transmission paths, respectively, and second and third ports connecting to a succeeding node via said first and second optical transmission paths, respectively, and wherein information is transported over each of said first and second optical transmission paths in a plurality of channels of respective wavelengths, said plurality channels being divided into service and protection channels such that the wavelengths of the service channels of one of the optical transmission paths respectively correspond to the wavelengths of the protection channels of the other one of the optical transmission paths, and apparatus that, responsive to a notification that one of the optical transmission paths connecting to the succeeding node has failed, switches the service channels received via said first port to said second port in place of the corresponding protection channels for delivery to the succeeding node via the other one of the optical transmission paths without having to convert the wavelengths of the switched service channels to the wavelengths of the corresponding protection channels.

3. A bi-directional line switched ring network formed from a plurality of optical nodes interconnected via first and second optical transmission paths, each of said optical nodes comprising first and second ports connecting to a preceding optical node via said first and second optical transmission paths, respectively, and third and fourth ports connecting to a succeeding node via said first and second optical transmission paths, respectively, and wherein information is transported over each of said first and second optical transmission paths in a plurality of channels of respective wavelengths, said plurality of channels being divided into service and protection channels such that the wavelengths of the service channels of one of the optical transmission paths respectively correspond to the wavelengths of the protection channels of the other one of the optical transmission paths, and a switchable loop-back path from said first port to said second port operative in the event that if said first optical transmission path connected to the third port fails, then the service channels destined for said succeeding node and received via said first port may be looped back via said second port and transported to said preceding node in the corresponding protection channels of said second optical transmission path.

4. The bi-direction line switched network of claim 3 wherein each of said nodes further comprises a switchable loop-back path from said third port to said fourth port such that if said second optical transmission connected to the second port fails, then the service channels destined for said preceding node and received via said fourth port may be looped back via said third port and transported to said preceding node in the corresponding protection channels of said first optical transmission path and said ring network.

5. The bi-directional ring network of claim 4 wherein said switchable loop-back path is formed by a three-to-one switch and a one-to-three switch for each of said channels, and further comprising a demultiplexer that demultiplexes a signal received via said first port into said channels and supplies each of the demultiplexed channels to the respective one-to-three switch that switches the received demultiplexed channel via the loop-back path for that channel to the three-to-one switch and thence to an output of the three-to-one switch, and a multiplexer that receives a respective channel from the output of each three-to-one switch and multiplexes the channel in sequence to said second optical transmission path.

6. A method of operating a two-fiber bi-directional ring network comprising the steps of interconnecting a plurality of optical nodes by first and second optical transmission fibers to form a ring network such that information is transported over the first and second fibers in opposite directions, designating first and second groups of transmission channels in said first fiber as service and protection channels, respectively, and designating corresponding first and second groups of transmission channels in said second fiber as protection and service channels, and further comprising in each of the nodes the step of responsive to receiving a notification that one of said first and second fibers connected to an output port of the respective one of said nodes has failed, switching the service group of channels of the failed fiber to the other one of said first and second fibers as the protection channels for the latter fiber without having to convert the service channels to protection channels as a result of said correspondence.

* * * * *